United States Patent Office 2,771,392
Patented Nov. 20, 1956

2,771,392

CARBOMYCIN COMPLEXES

Fred W. Tanner, Jr., and Thomas M. Lees, Baldwin, N. Y., and John B. Routien, Tenafly, N. J., assignors to Chas. Pfizer & Co., Inc., New York, N. Y., a corporation of Delaware No Drawing. Application April 6, 1953, Serial No. 347,152

6 Claims. (Cl. 167—65)

This invention is concerned with a new and useful group of complexes of a carbomycin antibiotic. It is also particularly concerned with certain novel compounds formed by the antibiotic carbomycin A and related compounds with aromatic organic compounds.

Carbomycin A is a valuable antibiotic which has been described and claimed in the copending patent application of Fred W. Tanner, Jr., et al., Serial No. 270,298, filed February 7, 1952 of which the present application is a continuation-in-part. A second carbomycin antibiotic, carbomycin B, which also occurs in the broth formed by aerobic growth of *Streptomyces halstedii* strains is described and claimed in our copending patent application Serial No. 346,464, filed April 2, 1953, by Fred W. Tanner, Jr., et al. The antibiotic may be recovered by various procedures such as extraction into various water-immiscible organic solvents. The antibiotic may be reextracted into dilute acid and the base may be precipitated by making such an aqueous solution alkaline. Other methods of recovery are also available.

It has now been found that definite chemical complexes are formed by the reaction of a variety of aromatic organic compounds with a carbomycin antibiotic. These materials are formed upon contacting solutions of the antibiotic even in very crude form such as fermentation broths or with partially purified or highly purified carbomycin antibiotic preparations. The new compounds are formed under slightly acid to alkaline conditions, that is, at pHs ranging from about 6.0 up. The use of pHs appreciably above about 10 has no advantages and may be somewhat deleterious to the antibiotic. pHs of about 7.5 to 9.5 are particularly useful. By "carbomycin antibiotic" is meant an antibiotic as produced by growth of selected strains of *S. halstedii* and the term includes not only carbomycin A but also carbomycin B.

The agents which form complexes with a carbomycin antibiotic include a variety of liquid aromatic compounds. These are aromatic solvents such as benzene, toluene, ethyl benzene, chlorobenzene, xylene, and so forth. In general, aromatic compounds with the exception of those which are highly basic readily form complexes with the antibiotic.

In the copending patent applications referred to above, it was pointed out that aromatic hydrocarbon solvents, particularly benzene, may be used for the extraction of the carbomycin antibiotics from aqueous solution. This process is preferably operated at slightly basic pHs, although neutral to alkaline pHs are useful. The antibiotic may be extracted from crude aqueous solutions, such as fermentation broths, or from more refined preparations or even from highly purified carbomycin antibiotic solutions. During the extraction with an aromatic solvent there is formed a complex of the antibiotic or mixture of antibiotics with the aromatic solvent which is stable under the conditions of the extraction and which, furthemore, has the decided advantage of being appreciably less soluble in water under the conditions of the extraction than is the antibiotic itself. This in itself is a valuable property of the complexes. The complexes have the further advantage of being more soluble in organic solvents of various types than are the carbomycin antibiotics themselves. This appreciably facilitates the recovery of the antibiotic.

If an aromatic hydrocarbon compound solution of a carbomycin antibiotic is carefully concentrated or if a solution of this nature is treated with a non-solvent for the complexes (e. g. a saturated hydrocarbon, hexane, pentane, etc.), the solid complexes may be obtained, often in crystalline form, if a solution of sufficient purity is used. The complexes may also be recrystallized in purer form, e. g. lower alcohols. This is a convenient method to further purify the antibiotic. The solid products may be converted to a carbomycin salt or carbomycin base as indicated elsewhere in the description of this invention.

As noted above, the aromatic compound complexes of a carbomycin antibiotic are stable under the neutral to basic conditions used during extraction of the antibiotic from aqueous solution. However, the complexes are not stable under acidic conditions. Thus, if a complex of the antibiotic or a solution of such a complex in a solvent is contacted with dilute aqueous acid, the complex is cleaved and the antibiotic becomes dissolved in the aqueous solution as a salt of the antibiotic. This is a convenient method of recovering the antibiotic from the complexes or from solutions of such complexes in organic solvents. A variety of acids including the stronger organic are useful, but the mineral acids, particularly hydrochloric acid, sulfuric acid, hydrobromic acid, phosphoric acid and others of this nature are particularly useful. Particularly strong aqueous solutions of the mineral acids should be avoided, since this may tend to decompose the antibiotic to a certain extent, especially if exposure to acid conditions is prolonged. In general, a concentration of less than about 5% by weight is preferable.

Alternative methods of converting the carbomycin complexes to the free carbomycin antibiotic may suggest themselves, such as heating the complex under vacuum. However, these methods are, in general, much less useful than is the process of contacting the complex with aqueous acid. The aqueous solution of an acid salt of the carbomycin antibiotic obtained by the latter method may be used as such, for instance, in therapy. However, in many cases it is advisable to partially or completely neutralize the excess acid present in the solution. A sufficiently concentrated solution of an acid salt of carbomycin A or B will, of course, yield solid carbomycin A or B base upon adjusting the pH of the solution to about 7 or higher. This material may be separated and dried for use in pharmaceutical products. Alternatively, the acid salts of the antibiotic may be separated in solid form, for instance, by addition of a suitable water-miscible solvent or by concentration at a low temperature (e. g. from the frozen state) under vacuum.

If insufficient of an aromatic compound is added to a carbomycin antibiotic solution to form a solution of the complex, the latter separates in solid form. This valuable property of the complexes, that is, an aqueous solubility lower than that of the antibiotics themselves is very useful as a means of separating the antibiotic.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

Example I

A selected strain of *Streptomyces halstedii* was cultivated in an aqueous nutrient medium under aerobic conditions and the resulting broth containing carbomycin antibiotics was filtered. The solution was extracted twice at pH 6.5 with one-quarter volume of methyl isobutyl ketone. The combined extracts were concentrated to one-tenth volume under vacuum, and the antibiotics were extracted into water adjusted to a pH of about 2 with sulfuric acid. After adjusting the separated aqueous solution to pH 6.5, the antibiotic was extracted into benzene and the solution was concentrated to a small volume. Addition of hexane resulted in the separation of a solid product containing the benzene complexes of carbomycin A and carbomycin B, present in the fermentation broth.

Example II

An *S. halstedii* fermentation broth containing carbomycin A, and carbomycin B was adjusted to pH 8 and extracted several times with small volumes of chloroform. The chloroform extracts were combined and the antibiotic was extracted into 0.1-Normal hydrochloric acid. The dilute aqueous solution of the antibiotic was adjusted to pH 8.5 and extracted with toluene. The toluene solution was concentrated at room temperature under vacuum to obtain a solid product containing a high proportion of the toluene complex of carbomycin A.

What is claimed is:

1. A complex of a carbomycin antibiotic selected from the class consisting of carbomycin A and carbomycin B with a compound selected from the class consisting of a liquid aromatic hydrocarbon and chlorobenzene.

2. A complex of a carbomycin antibiotic selected from the class consisting of carbomycin A and carbomycin B with benzene.

3. A complex of a carbomycin antibiotic selected from the class consisting of carbomycin A and carbomycin B with toluene.

4. A complex of a carbomycin antibiotic selected from the class consisting of carbomycin A and carbomycin B with ethyl benzene.

5. A complex of a carbomycin antibiotic selected from the class consisting of carbomycin A and carbomycin B with chlorobenzene.

6. A complex of a carbomycin antibiotic selected from the class consisting of carbomycin A and carbomycin B with xylene.

References Cited in the file of this patent

UNITED STATES PATENTS

| | | |
|---|---|---|
| 2,378,449 | Tishler | June 19, 1945 |
| 2,482,055 | Duggar | Sept. 13, 1949 |
| 2,516,080 | Sobin | June 18, 1950 |
| 2,653,899 | Bunch et al. | Sept. 29, 1953 |